US012114130B2

(12) United States Patent
Ehrig et al.

(10) Patent No.: US 12,114,130 B2
(45) Date of Patent: Oct. 8, 2024

(54) MICROELECTROMECHANICAL SOUND TRANSDUCER SYSTEM

(71) Applicant: Arioso Systems GmbH, Dresden (DE)

(72) Inventors: Lutz Ehrig, Dresden (DE); Tilman Koch, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 17/887,242

(22) Filed: Aug. 12, 2022

(65) Prior Publication Data

US 2023/0101608 A1 Mar. 30, 2023

(51) Int. Cl.
*H04R 19/02* (2006.01)
*G10K 11/178* (2006.01)
*H04R 19/04* (2006.01)

(52) U.S. Cl.
CPC ........... *H04R 19/02* (2013.01); *G10K 11/178* (2013.01); *H04R 19/04* (2013.01); *H04R 2201/003* (2013.01)

(58) Field of Classification Search
CPC .. H04R 19/02; H04R 19/04; H04R 2201/003; H04R 1/1016; G10K 11/178
USPC ................ 381/23.1, 71.1, 74, 312, 328, 380
See application file for complete search history.

(56) References Cited

U.S. PATENT DOCUMENTS 5,182,774 A * 1/1993 Bourk .................. H04R 1/1083 381/372
9,164,277 B2 10/2015 Conrad et al.
10,457,544 B2 10/2019 Schenk et al.
11,184,718 B2 * 11/2021 Voss ........................ H04R 1/227
2017/0230744 A1 * 8/2017 Schrader .......... G10K 11/17855
2017/0334715 A1 * 11/2017 Bolognia .............. B81B 7/0032
2021/0227324 A1 7/2021 Beltrami et al.
2021/0281940 A1 * 9/2021 Zhao ...................... H04R 17/00

(Continued)

FOREIGN PATENT DOCUMENTS

EP 3739904 A1 11/2020
GB 2538432 A 11/2016

(Continued)

OTHER PUBLICATIONS

EP Search Report for EP Application No. 21198862.1 dated Mar. 23, 2022.

(Continued)

*Primary Examiner* — William A Jerez Lora

(57) ABSTRACT

This invention relates to a microelectromechanical loudspeaker implemented as a system-on-chip or system-in-package. The microelectromechanical loudspeaker includes a microelectromechanical sound-generating device implemented in a microelectromechanical system (MEMS) and a microphone mounted on the cover or integrated in the cover, wherein the microphone is positioned adjacent to one of the sound outlet openings of the cover. The MEMS comprises a cavity formed between a planar cover, a planar base and circumferential sidewalls provided between the cover and the base. The MEMS further comprises a plurality of movable actuators for generating sound. The actuators are provided in the cavity between the cover and the base, and wherein the cover and the base have a plurality of sound outlet openings to emit sound in a direction transverse to the cover and the base, respectively.

20 Claims, 12 Drawing Sheets

(56) References Cited

U.S. PATENT DOCUMENTS

| | | | | |
|---|---|---|---|---|
| 2022/0070591 | A1 | 3/2022 | Kaiser | |
| 2023/0322546 | A1* | 10/2023 | Langa .................... | H04R 19/02<br>257/415 |

FOREIGN PATENT DOCUMENTS

| | | | |
|---|---|---|---|
| WO | 2021223886 | A1 | 11/2021 |
| WO | 2022053165 | A1 | 3/2022 |

OTHER PUBLICATIONS

Stefan Liebich, et al., "Signal Processing Challenges for Active Noise Cancellation Headphones," 13. ITG Fachtagung Sprachkommunikation/Speech Communication, Oldenburg, Germany, Oct. 2018 (available at http://ikspub.iks.rwth-aachen.de/pdfs/liebich18c.pdf).

* cited by examiner

MICROELECTROMECHANICAL SOUND TRANSDUCER SYSTEM

CROSS-REFERENCE TO RELATED APPLICATIONS

This application claims priority to EP Application No. 21198862.1, filed Sep. 24, 2021, entitled "Microelectromechanical Sound Transducer System," the disclosure of which is incorporated by reference in its entirety for all purposes.

TECHNICAL FIELD

Embodiments of the invention relate to a microelectromechanical sound transducer systems and devices. In some embodiments of the invention, the microelectromechanical sound transducer system is implemented in a chip/die, e.g. in form of a System-on-Chip (SoC) or a System-in-Package (SiP). Some embodiments provide a microelectromechanical sound transducer system implementing active noise cancellation (ANC).

BACKGROUND

Sound is a change in pressure over time in an elastic carrier medium, such as air or a liquid. Acting as actuators, loudspeakers generate changes in pressure. Microphones act as sensors and can record changes in pressure and convert them into electrical signals. Loudspeakers and microphones belong to the group of sound transducers, wherein the conversion of the electrical signals into mechanical work or vice versa is usually realized by means of an oscillating unit, such as a membrane. Depending on the field of application, sound transducers can differ greatly from one another in terms of design and size and are found, for example, in loudspeaker boxes, near-field loudspeakers (e.g. integrated in mobile device, such as smartphones), headphones, earbuds or hearing aids. By means of sound output or recording via the sound transducer, sound transducers can realize various functions and facilitate different uses, for example, in the field of entertainment, measurement technology or hearing aid.

Due to the type and design, previous sound transducers are often subject to functional restrictions, so that frequently no suitable sound conversion can take place. Shortcomings of sound transducer designs relate, for example, to quality of the acoustics, energy efficiency, electromagnetic compatibility (EMC) or a required installation space. Furthermore, for example, an assembly of individual components to form sound transducers or sound transducer systems is complex as the size of the devices decreases. Recently, micro-electromechanical system (MEMS)-based sound transducer designs have been proposed which address at least some of the shortcomings indicated above. MEMS-based sound transducer devices can use different mechanisms for sound generation. For example, piezoelectric sound transducers, electrostatically driven sound transducers, etc. are available as MEMS-based devices allowing for energy efficient operation and larger scales of integration to promote miniaturization of the overall sound transducer system. For hearing aids usually magnetic or balanced armature (BA) drivers are employed.

Examples of MEMS-based sound transducer designs using electrostatically driven actuators to generate sound are known from WO 2012/095185 A1 and WO 2016/202790 A2.

Another example of a MEMS-based sound transducer system is WO 2018/167272 A1 suggesting a piezoelectric element for sound generation. The MEMS-based sound transducer system is operable as microphone and a loudspeaker.

Modern headphones, earbuds or hearing aids implement active noise cancellation (ANC) functions in order to improve the sound quality of the sound transducer system by applying a cancellation signal that is to compensate for the ambient noise. ANC uses microphones and speakers to reduce background and surrounding noises (ambient noises). A more sophisticated type of ANC where the level of noise cancelling digitally adapts to the surroundings is Adaptive ANC using microphones and speakers to adjust to listener's surroundings automatically. Further, there is also Adjustable ANC allowing the listener to select how much background noise the listener hears by manually adjusting noise cancellation levels.

Irrespective of the type of ANC, modern active noise cancellation systems are usually implemented as a hybrid system, i.e. one microphone picks up the ambient noise (feedforward microphone) and one microphone is located directly in front of the loudspeaker (feedback microphone) and picks up the sound directly in the ear canal. The aim of the ANC algorithm is to minimize the sound in the ear canal caused by ambient noise. The article by Stefan Liebich et al., "Signal Processing Challenges for Active Noise Cancellation Headphones", 13. ITG Fachtagung Sprachkommunikation/Speech Communication, Oldenburg, Germany, October 2018 (available at http://ikspub.iks.rwth-aachen.de/pdfs/liebich18c.pdf) provides an overview of the challenges of building an ANC headphone, including acoustic front-end, electronic back-end and algorithmic realization, for the example of an in-ear headphone.

FIG. 1 shows a simplified signal flow of an exemplary hybrid ANC system which is used to explain the basics of ANC. An external microphone picks up the ambient noise x(t) and a filter W(z) generates the cancellation signal y(n). This feedforward system can be extended to include a feedback loop by adding an internal microphone, which picks up the error signal e(t) and through a filter K(z) generates a cancellation signal u(n) through a filter. The combination of these two approaches is called a hybrid ANC system. The desired audio signal or useful signal is a(n).

The transmission path from external microphone to internal microphone is called the primary path P(z). The path from the loudspeaker to the internal microphone is called the secondary path G(z). The secondary path includes—in the case of a digital system—all steps from the digital output y(n) of the combined cancellation signal to the digital input signal e(n), i.e. in particular the digital-to-analogue conversion, the loudspeaker characteristics, the acoustic path loudspeaker-microphone, the microphone characteristics and the analogue-to-digital conversion.

All components involved in signal processing need time to process signals and to generate an output signal. In order to optimize the performance of an ANC system, the acoustic path between the external microphone and the loudspeaker should be as large as possible in order to "gain" time for the generation of the cancellation signal y(n). For the secondary path G(z) the opposite is true: the delay of the secondary path should be as small as possible.

In addition to the amplitude margin, the phase margin is important for the stability of feedback systems, i.e. the additional phase shift that is allowable before positive feedback (i.e. an unwanted amplification of a noise) occurs in the system. The larger the phase margin, the more robust the ANC system is against external influences (e.g. changes in the transfer function), and longer filters can be used (e.g. for the noise compensation of the loudspeaker). The phase offset of the acoustic path loudspeaker-microphone can be easily determined for a given geometrical arrangement.

Within this context, there is a need to improve the design of sound transducer systems.

BRIEF SUMMARY OF THE INVENTION

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the invention is to improve the miniaturization of a sound transducer system including multiple sound transducers. According to this aspect, the sound transducer system may include a sound generating device (as a first sound transducer) and a sound receiving device (as a second sound transducer), e.g. a microphone, wherein the sound receiving device is mounted on a surface of the housing or integrated in the housing of the sound generating device. The sound generating device may be a chip/die, e.g. a system-on-chip or system-in-package. Conventionally, such stacking of sound transducers on each other may not be desirable due to the structure-borne sound coupling between the two transducers, and might even not be possible depending on the implementation.

In embodiments of the invention, the sound generating device is a MEMS-based sound generating device, which allows avoiding or substantially reducing the structure-borne sound coupling. In particular, the MEMS-based sound generating device has a cavity formed between a planar cover, a planar base and circumferential sidewalls provided between the cover and the base (thereby providing an enclosure of the cavity and/or a chip housing). The MEMS-based sound generating device further comprises a plurality of movable actuators for generating sound. These actuators are provided in the cavity between the cover and the base. In some example embodiments, the actuators are movable in the plane between the cover and the base and/or transverse to the direction of sound emission of the MEMS-based sound generating device. The actuators may be driven electrostatically, but this is only one example how the actuators can be driven.

The cover and optionally the base have a plurality of sound outlet openings to emit sound in a direction transverse to the cover (and optionally the base). In other embodiments, sound outlet openings may also be arranged in the sidewalls. In this case, the cover, the base or both may not have any sound outlet openings. When providing sound outlet openings in the sidewalls, the sound is (also) emitted transverse to the sidewalls. The cover and the base may have a planar structure (that extends substantially in two dimensions). The plane in which the actuators are movable may be in parallel with the planar cover, the planar base or both. Assuming that the movement of the actuators is across the direction of the sound excitation of the sound receiving device, e.g. a microphone, structure-borne sound coupling between the cover and the sound receiving device be substantially reduced or avoided.

The second sound transducer may be a microphone that is mounted to the cover of the MEMS-based sound generating device. The second sound transducer may be for example positioned adjacent to at least one of the sound outlet openings of the cover. In some embodiment, the second sound transducer may be for example positioned between two sound outlet openings of the cover. The sound is emitted through the sound outlet openings of the cover. The cover (and the base) may be a stiff cover (and a stiff base, respectively) to further suppress and/avoid structure-borne sound coupling between the cover and the sound receiving device.

In some embodiments of the invention, the one or more microphones of the sound transducer system may be used to implement ANC functionality in the sound transducer system, but the invention is not limited in this respect.

Some of the various embodiments described herein provide a microelectromechanical loudspeaker system implemented as a system-on-chip (SoC) or system-in-package (SiC). The microelectromechanical loudspeaker system comprises a microelectromechanical sound-generating device implemented in a microelectromechanical system (MEMS). The MEMS comprises a cavity formed between a planar cover, a planar base and circumferential sidewalls provided between the cover and the base.

The microelectromechanical loudspeaker system further comprises a microphone mounted on the cover or integrated in the cover, wherein the microphone is positioned adjacent to at least one sound outlet opening of the cover.

In some embodiments, the MEMS further may comprise a plurality of movable actuators for generating sound. The actuators may be provided in the cavity between the cover and the base. The cover and the base have a plurality of sound outlet openings to emit sound in a direction transverse to the cover and the base, respectively.

In some embodiments of the microelectromechanical loudspeaker system, which can be combined with any of the embodiments of the microelectromechanical loudspeaker system discussed herein, the acoustic path between the microphone and the at least one adjacent sound outlet opening is less than or equal to 2 mm, and preferably less than or equal to 1 mm.

In some embodiments of the microelectromechanical loudspeaker system, the microelectromechanical loudspeaker system implements an active noise cancelling (ANC) function. The microphone is configured to detect the sound emitted through the sound outlet openings of the cover and interference noise. The microelectromechanical loudspeaker system further comprises a control system configured to control the sound generation of the microelectromechanical sound-generating device based on the sound detected by the microphone and interference noise such that the detected interference noise is suppressed.

In a further embodiment, the control system is configured to control sound generation of the microelectromechanical sound-generating device using an actuation signal that drives the actuators, and to receive a feedback signal from the microphone, wherein the feedback signal represents the sound emitted through the sound outlet openings of the cover and the interference noise.

In some embodiments of the microelectromechanical loudspeaker system, which can be combined with any of the embodiments of the microelectromechanical loudspeaker system discussed herein, the position of the microphone on the cover is selected such that the phase difference between the (discrete) actuation signal and the (discrete) feedback signal is less than or equal to 2° to realize a cut-off frequency of at least 1 kHz, preferably 2 kHz or more and more preferably 3 kHz or more.

In some embodiments of the microelectromechanical loudspeaker system, which can be combined with any of the embodiments of the microelectromechanical loudspeaker system discussed herein, the microelectromechanical sound-generating device is a multilayer silicon, germanium or silicon-germanium device. The cover, the base, and the actuators may be for example formed in different layers of the multilayer silicon, germanium or silicon-germanium device.

In some embodiments of the microelectromechanical loudspeaker system, which can be combined with any of the embodiments of the microelectromechanical loudspeaker system discussed herein, the microphone is provided as a discrete MEMS component mounted on the cover of the microelectromechanical sound-generating device. The microphone may be connected to the cover of the microelectromechanical sound-generating device in an electrically conductive manner to supply a feedback signal to the control system via electrically conductive paths of the microelectromechanical sound-generating device, wherein the feedback signal represents the sound emitted through the sound outlet openings of the cover and the interference noise.

In alternative embodiments, the microphone may be formed in one or more semiconductor layers of the semiconductor device on a side of the cover facing away from the actuators.

In some embodiments of the microelectromechanical loudspeaker system, which can be combined with any of the embodiments of the microelectromechanical loudspeaker system discussed herein, the control system is arranged on the base and/or the cover of the microelectromechanical sound-generating device. The control system is connected to the microelectromechanical sound-generating device (and the microphone) in an electrically conductive manner.

In some embodiments of the microelectromechanical loudspeaker system, which can be combined with any of the embodiments of the microelectromechanical loudspeaker system discussed herein, the microelectromechanical loudspeaker system further comprises a plurality of microphones positioned in the planar footprint of the microelectromechanical sound-generating device between respective adjacent sound outlet openings of the cover. The microphones are positioned and/or configured to detect the sound emitted through the respective sound outlet openings of the cover and any interference noise. When multiple microphones are used, the length of the acoustic path between each of the microphones and one of its adjacent sound outlet openings may be less than or equal to 2 mm and preferably less than or equal to 1 mm.

In some embodiments of the microelectromechanical loudspeaker system, which can be combined with any of the embodiments of the microelectromechanical loudspeaker system discussed herein, the cavity of the microelectromechanical sound-generating device consists of multiple independent sub-cavities. Each of the independent sub-cavities may for example comprise one or more of the actuators for generating sound in an associated frequency band of the audible frequency spectrum which is emitted through sound outlet openings of the cover and the base provided in the planar footprint of each of the sub-cavities. The generating sound may also be, at least in part, outside the audible frequency spectrum. In a further variation of those embodiments, the microelectromechanical loudspeaker system may for example comprise multiple microphones provided on the cover or integrated in the cover of the microelectromechanical sound-generating device to detect the sound generated and emitted from the independent sub-cavities and interference noise.

In some embodiments of the microelectromechanical loudspeaker system, which can be combined with any of the embodiments of the microelectromechanical loudspeaker system discussed herein, the actuators are movable in a plane that is parallel to the cover and/or transverse to the direction of the sound emitted from the cover.

In some embodiments of the microelectromechanical loudspeaker system, which can be combined with any of the embodiments of the microelectromechanical loudspeaker system discussed herein, the cover has a stiffness selected to avoid structure-borne sound coupling between the cover and the microphone mounted on the cover or integrated in the cover. In some embodiments, the cover has a stiffness configured so that a sound pressure component caused by a vibration of the cover is at least 60 dB lower than the sound pressure component caused by the sound emitted through the sound outlet openings of the cover.

In some embodiments of the microelectromechanical loudspeaker system, which can be combined with any of the embodiments of the microelectromechanical loudspeaker system discussed herein, the microphone comprises a membrane to receive sound emitted through the sound outlet openings of the cover and interference noise. The excitation of the membrane is in a direction (substantially) perpendicular to a plane defined by the planar surface of the planar cover.

Further embodiments provide a near-field speaker, a headphone, and a hearing aid device. Each such device may comprise a microelectromechanical loudspeaker system according to one of the various embodiments and their variations described herein. In the embodiments discussed herein, the cover of the microelectromechanical sound-generating device may be facing the ear or eardrum of the user of the device.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
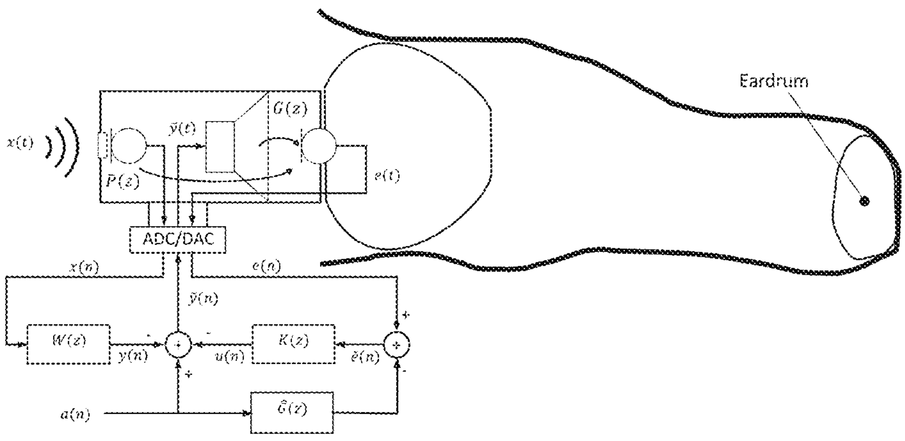
FIG. 1 shows a simplified signal flow of an exemplary hybrid ANC system which is used to explain the basics of ANC.

Different embodiments of the invention will be outlined in the following in more detail. As noted, this disclosure generally relates to a microelectromechanical sound transducer systems and devices. The microelectromechanical sound transducer system can be implemented as a chip/die, e.g. as a System-on-Chip (SoC) or a System-in-Package (SiP). In some embodiment the microelectromechanical sound transducer system implements active noise cancellation (ANC). To achieve further miniaturization of a sound transducer system including multiple sound transducers, embodiments of the invention suggest a sound transducer system that includes a sound generating device (as a first sound transducer) and a sound receiving device (as a second sound transducer), e.g. a microphone, where the sound receiving device is mounted on a surface of the chip housing or integrated in the chip housing of the sound generating device. In the embodiments described herein below, the sound generating device may comprise a cover and a base that are forming part of an enclosure of a cavity in which one or more actuators of the sound generating device move to generate a sound pressure. The sound pressure is emitted though one or more openings or through holes in the cover and base. It is assumed for illustration purposes only that the sound receiving device is mounted on or integrated in the cover of the sound generating device.

In some embodiments, the structure-borne sound coupling between the two transducers can be avoided or substantially reduced by ensuring that the sound generation in the first sound transducer does not affect sound reception in the second sound transducer. This may be achieved, for example, by ensuring that direction of the movement of the actuators in the cavity of the sound generating transducer to produce sound pressure is across the direction in which the sound receiving device, e.g. a microphone, is excited. For example, if the sound receiving device measures sound pressure by the displacement of a membrane in a first direction, the sound generation device may be designed that the sound pressure is generated by actuators moving in a plane or second direction that is (substantially) perpendicular to the first direction. Furthermore, or alternatively, the stiffness (i.e. the extent to which an object resists deformation in response to an applied force) of the cover of the sound generating device may also influence the level of structure-borne sound coupling between the two transducers.

Therefore, in some embodiments, the cover (and optionally also the base) of the sound generating device may be designed to be stiff. “Stiff” means, in one example definition, that the sound pressure emitted from the sound generating transducer is the sound pressure generated by the movement of actuators in the cavity of the sound generating transducer, whereas sound pressure components resulting from oscillation/vibration of the cover (and the base) are neglectable. According to one example embodiment, the cover (and base) is (are) designed in such a way that its vibration amplitude and vibration area results in a sound pressure contribution that is at least 40 dB (preferably at least 50 dB and at least 60 dB) lower than the (intended) sound pressure component caused by a sound pressure provided from the inside of the sound generating device (i.e. by the movement of the actuators in the cavity) through the openings or through holes of the cover (or base). The vibration amplitude of a surface (i.e. the cover and the base) may be measured using vibrometry (e.g. by means of laser Doppler vibrometer), and the sound pressure component can be determined based on the measurements.

The stiffness of the cover (and base), in particular, the bending stiffness in the direction of perpendicular to the surface plane of the cover (and base), can be controlled by selecting the materials and/or geometry of the sound generating device. For example, the cover and base may be a flat, planar structure that can be manufactured using conventional semiconductor manufacturing techniques. Sufficient stiffness can be for example realized by controlling the thickness of the cover (and base) in a thickness direction, selection of the material(s) of the cover (and base), the structuring of the cover (and base), dimensions of the enclosed cavity (or sub-cavities) in the plane perpendicular to the thickness direction, or a combination thereof. In one exemplar embodiment, the sound generating device is a multilayer silicon device, where the cover, the base, and the actuators are formed in different layers of the multilayer silicon device. The sound generating device may also be formed as a multilayer germanium or silicon-germanium device.

Figure 2:
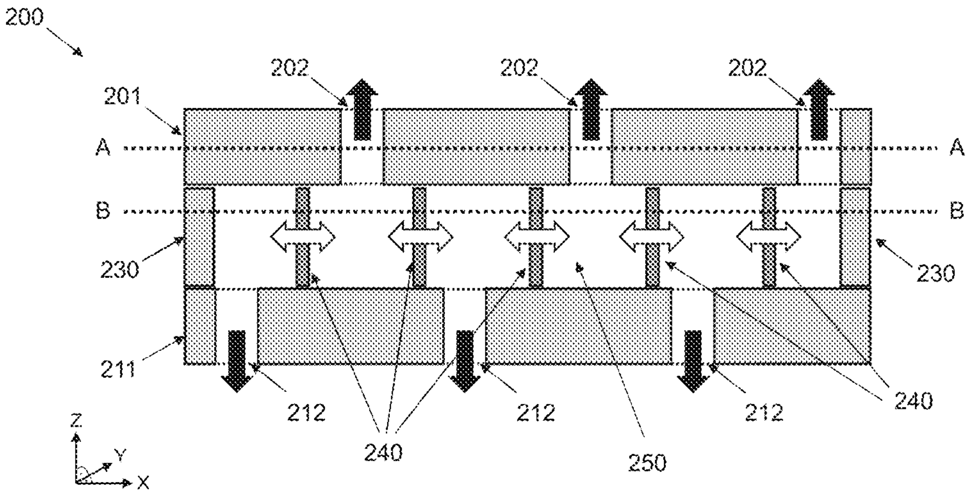
FIG. 2 shows a sound generating device according to an example embodiment.

An example embodiment of sound generating device is shown in FIG. 2. The sound generating device in FIG. 2 is a micro-electromechanical system (MEMS)-based sound transducer 200 that is to emit sound. FIG. 2 is to be considered an abstract example of the principles of a MEMS-based sound transducer that can be used to implement the embodiments according to the disclosure. In general, embodiments of the invention can be implemented using MEMS-based sound transducers that are based on the technologies disclosed in PCT applications WO 2016/202790 A2, WO 2012/095185 A1 A2, PCT/EP2020/075654, or PCT/EP2020/062901 (each of which is incorporated herein by reference in its entirety).

Figure 3:
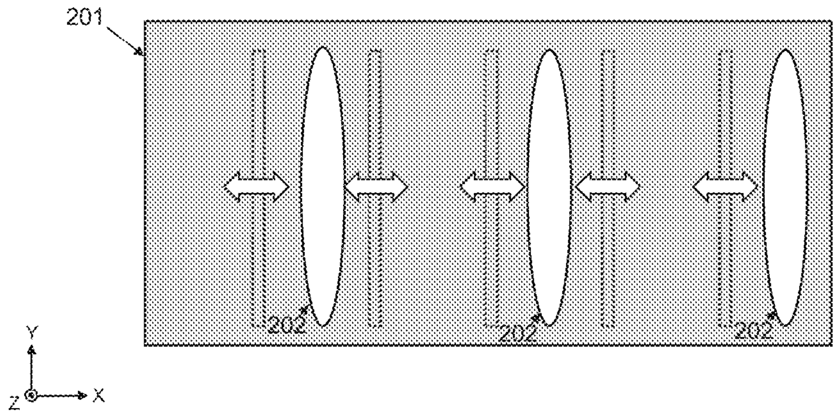
FIG. 3 shows an exemplary cross-section the sound generating device in FIG. 2 along the line A-A.

The MEMS-based sound transducer 200 comprises a cover 201 and a base 211. For exemplary purposes only, it may be assumed that the cover 201 faces the ear or eardrum, when the MEMS-based sound transducer 200 is used in, for example, a near-field speaker, a headphone, or as a hearing aid. Accordingly, the base 211 will be on the opposite side of that ear or eardrum. Cover 201 and the base 211 are flat, plane-like structures spanning mainly in the X (width) and Y (depth) direction, as indicated in FIG. 2 (i.e. their dimension in the thickness direction (Z direction) is substantially smaller than that in the width and depth direction). The cover 201 has one or more sound outlet openings 202 from which sound pressure is emitted, as indicated by the black arrows in FIG. 2. Further example details of the cover 201 and the sound outlet openings 202 are shown in FIG. 3, which shows a cross-section of the cover 201 along the line A-A in FIG. 2. The sound outlet openings 202 may have an elongated shape. The sound outlet openings 202 may be provided (substantially) above the actuators 240 in the thickness direction. Optionally, the sound outlet openings 202 may be shaped to follow the shape of the actuators 240 in the X direction and/or Y direction.

Similarly, the base 211 also has one or more sound outlet openings 212 from which sound pressure can be emitted in an opposite direction as also indicated by the black arrows in FIG. 2. The one or more sound outlet openings 212 are optional. The shape of the sound outlet openings 212 may be designed in a similar fashion as the shape of the sound outlet openings 202 of the cover 201.

Figure 4:
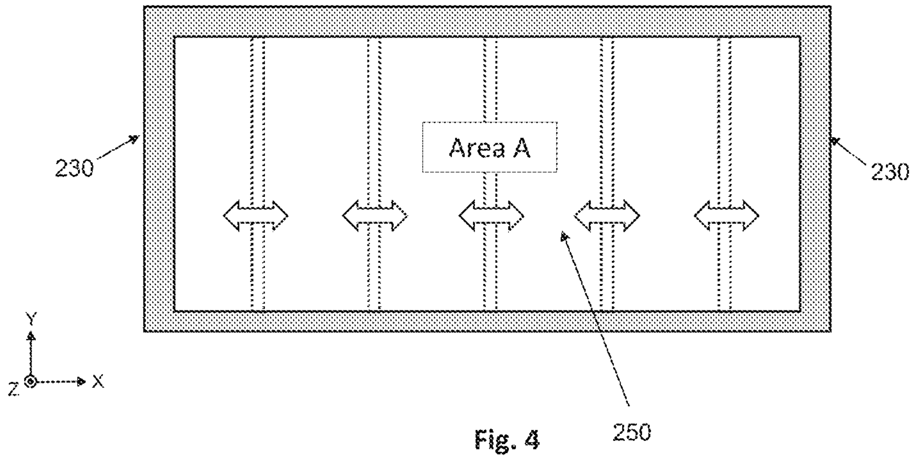
FIG. 4 shows an exemplary cross-section the sound generating device in FIG. 2 along the line B-B.

Cover 201 and base 211 are spaced apart (in a Y direction (thickness direction)) by sidewalls 230 and cover 201, base 211 and sidewalls 230 enclose a cavity 250. This is illustrated in FIG. 2, which is a cross section of the MEMS-based sound transducer 200 as shown in FIG. 2 along the lines B-B. As shown in FIG. 4, when viewed in the Z direction, the lower surface of the cover at 201 towards the cavity 250 defines an area A, which has one or more sound outlet openings 202.

In other embodiments, sound outlet openings may also be arranged in the sidewalls 230. Sound outlet openings in the sidewalls 230 may be in addition to the sound outlet openings 202 in the cover 201. In other embodiments, the cover, the base or both may not have any sound outlet openings 202, 212, i.e. the sound outlet openings are provided in the sidewalls 230 only. When providing sound outlet openings in the sidewalls 230, the sound is emitted transverse to the sidewalls 230, and—if present—the other sound outlet openings 202 and/or 212.

The area A of the cover 201 that encloses the cavity 250 may be in the range from 1 $mm^2$ to 100 $mm^2$, preferably in the range from 10 $mm^2$ to 40 $mm^2$, and more preferably in the range from 6 $mm^2$ to 30 $mm^2$, and even more preferably in the range from 6 $mm^2$ to 15 $mm^2$. These surface area A contains the one or more sound outlet openings 202 that connect the cavity 250 of the MEMS-based sound transducer 200 with the environment for the purpose of sound output. The surface area of the openings 202 in the cover 201 (base 211) in comparison to the overall surface area A of the cover 201 (or base 211) is in the range from 10% to 40%.

The MEMS-based sound transducer 200 further includes plural actuators 240. The actuators 24 are provided within the cavity 250 of the MEMS-based sound transducer 200. The sound pressure is generated by the movement of plural actuators 240 in the cavity 250 within a plane that is perpendicular to the thickness direction (Z direction). For example, in FIGS. 3 to 5, the actuators are indicated by the dotted lines and their movement is indicated by the white double arrows in the X direction. In principle, the actuators 240 can move in a plane that is perpendicular to the thickness direction in the X direction and/or Y direction.

The sound generated by the MEMS-based sound transducer 200 may be in the audible frequency spectrum i.e. the hearing range (conventionally, 20 to 20,000 Hz) of humans. However, this disclosure is not limited in this respect, and the MEMS-based sound transducer 200 may generate sound pressure in a frequency range that is at least in part or entirely out of the hearing range. For example and in accordance with embodiments the MEMS-based sound transducer 200 may emit frequencies that are entirely or at least in part outside the hearing range. This may be useful for audio-specific applications. One example for an audio-specific application where the frequencies may be outside the audible frequency range is the acoustic measurement of the auditory canal.

Figure 11:
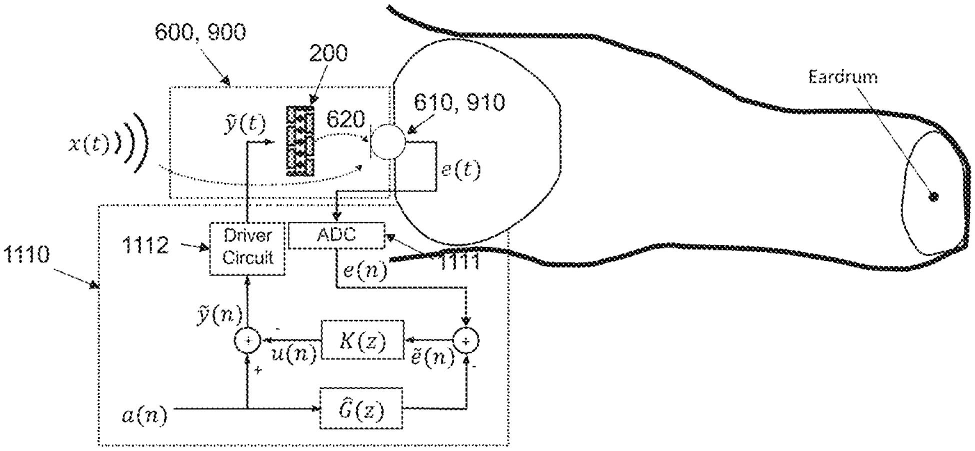
FIG. 11 shows an example embodiment of using a micromechanical loudspeaker system 600 or micromechanical loudspeaker system 900 in combination with a control system 1110 to implement ANC.

The actuators 240 may be, for example, electrostatically driven using an actuation signal $\tilde{y}(t)$ (see FIG. 11). However, also alternative mechanisms to generate a sound pressure in the thickness direction (Z direction) could be used. For example, one or more membranes (or portions thereof) that moves in X direction and/or Y direction could be used within the cavity 250 to generate a sound pressure that is emitted from the MEMS-based sound transducer 200 in the thickness direction (Z direction). A control system (not shown) that controls the sound generation of the MEMS-based sound transducer 200 may be provided, for example, at the bottom surface of the base 211 facing away from the cavity 250 (see FIG. 2). The control system provides the actuation signal $\tilde{y}(t)$ to control the movement of the actuators 240 within the cavity 250 of the MEMS-based sound transducer. As will be explained herein below in more detail in connection with FIG. 11, the control system may be the control system 1110 that implements ANC functionality. In some embodiments, the control system is mounted to the base 211. Alternatively, the MEMS-based sound transducer 200 can be provided adjacent to the control system within a SoC or SiP.

Figure 5:
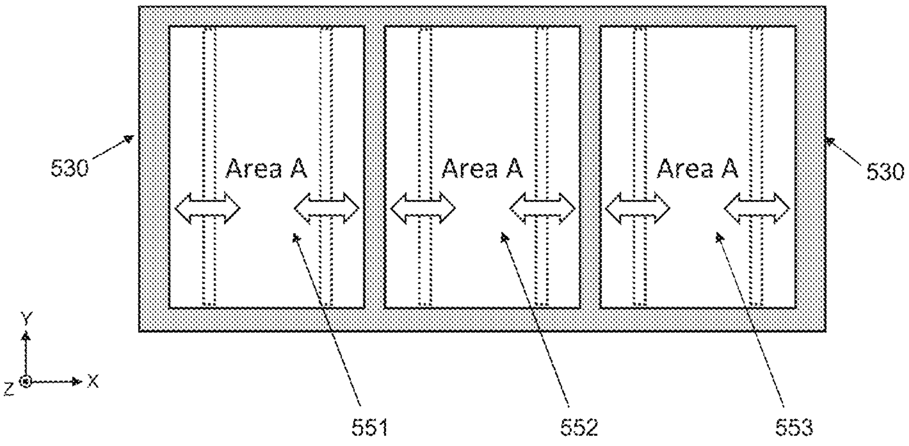
FIG. 5 shows another cross-section along the line B-B in FIG. 2 of an alternative embodiment of a sound generating device.

In an alternative embodiment, as shown in FIG. 5, there may be more than a single cavity 250 provided within the MEMS-based sound transducer 200. For example, the sidewalls 530 may separate the interior space between the cover 201 and the base 211 in more than one sub-cavities 551, 552, 553. When viewed in the Z direction, the lower surface of the cover at 201 towards the sub-cavities 551, 552, 553 defines respective areas A. Each of the sub-cavities 551, 552, 553 may include one or more actuators 240 to generate a respective sound pressure component within the respective sub-cavity. Each of the areas corresponding to a respective one of the sub-cavities 551, 552, 553 might include one or more sound outlet openings 202 in the cover 201, so that sound pressure can be emitted from the respective sub-cavity. Optionally, the sub-cavities 551, 552, 553 might be associated with different frequency ranges that cover individual portions of the hearing range, so that each of the sub-cavities 551, 552, 553 generates a sound pressure component in its associated frequency range. As noted, this disclosure is not limited to sound generation and is not limited to the hearing range, but the MEMS-based sound transducer 200 may be configured to emit sounds at least in part or entirely in the non-audible range. The frequency ranges of the individual sub-cavities 551, 552, 553 might overlap. The sum of the sound pressure components generated in each of the sub-cavities 551, 552, 553 and emitted from the MEMS-based sound transducer 200 may advantageously cover the audible range of the spectrum.

The areas A associated with the individual sub-cavities 551, 552, 553 may not be identical and might be different from each other. This may be useful to cover individual frequency ranges of the audible spectrum using the individual sub-cavities 551, 552, 553. The sum of all areas A of the cover 201 enclosing the sub-cavities 551, 552, 553 may be in the range from 1 $mm^2$ to 100 $mm^2$, preferably in the range from 10 $mm^2$ to 40 $mm^2$, and more preferably in the range from 6 $mm^2$ to 30 $mm^2$, and even more preferably in the range from 6 c to 15 $mm^2$.

In some embodiments, the MEMS-based sound transducer 200 is a multi-layer semiconductor device. In some embodiments, the MEMS-based sound transducer 200 is a multi-layer silicon device. Accordingly, in embodiments of the invention, the MEMS-based sound transducer 200 may be manufactured using (conventional) semiconductor manufacturing processes known in the art. For example, each of the (a) cover 201, (s) the sidewalls 230/530 enclosing the cavity 250/cavities 551, 552, 553 and the actuators 240, and (c) the base 211 may be implemented in one or more layers of the multilayer semiconductor device, respectively. The structures of the cover 201, the sidewalls 230/530, the actuators 240, and the base 211 may be formed from a semiconductor substrate by etching processes, for example reactive ion deep etching. If layers are to be bonded together, the bonding can be realized using metallic or polymeric bonding agents.

Figure 6:
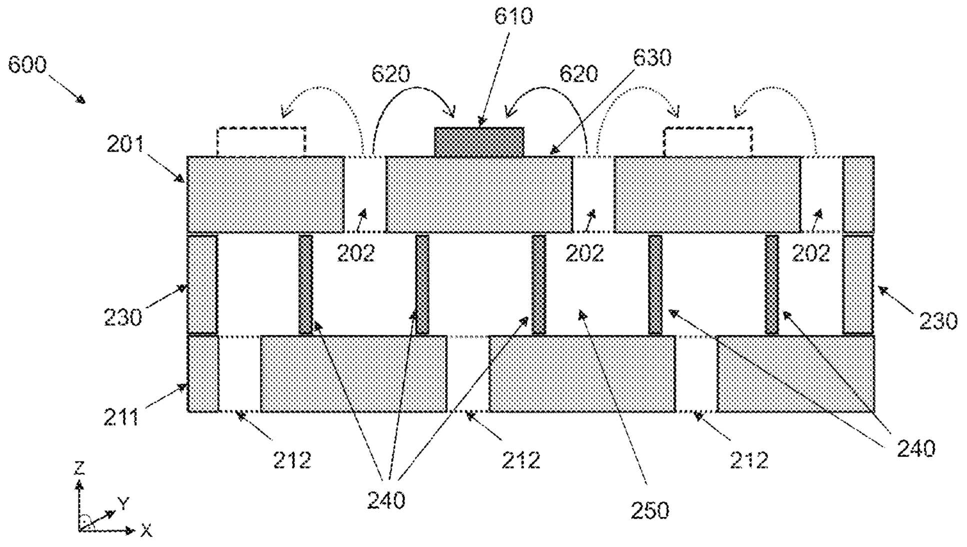
FIG. 6 shows a micromechanical loudspeaker system 600 according to an example embodiment.
Figure 7:
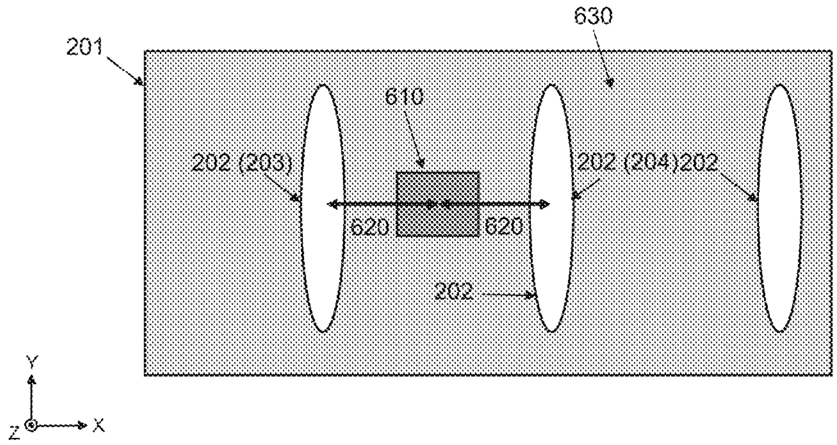
FIG. 7 shows an exemplary view on the cover 201 of the micromechanical loudspeaker system 600 of FIG. 6 in the thickness direction on the upper surface 630 of the cover 201.

Turning to FIG. 6, which is an exemplary embodiment of a micromechanical loudspeaker system 600, one or more microphones 610 can be mounted on the cover 201 of the MEMS-based sound transducer 200 outlined in connection with FIGS. 2-5 herein above. The microphone 610 is mounted on the cover 201 adjacent to one of the sound outlet openings 202. In the depicted example, the microphone 610 is positioned between (at least) two sound outlet openings 202 of the cover 201. In the exemplary embodiment of FIG. 6, a single microphone 610 is shown to be mounted on the surface 630 of the cover 201 facing away from the cavity 250. This is also highlighted in FIG. 7 showing a view on the cover 201 of the micromechanical loudspeaker system 600 of FIG. 6 in the thickness direction on the upper surface 630 of the cover 201 facing away from the cavity 250.

In other embodiments, additional microphones can be mounted to the upper surface 630 of the cover 201 as illustrated by the dotted rectangles in FIG. 6. When providing multiple microphones on the cover 201, the microphones may be distributed in the X direction and/or Y direction of the upper surface 630 of the cover 201. The one or more microphones 610 may be discrete components mounted on the cover 201 of the MEMS-based sound transducer 200. In some example implementations, the one or more microphone 610 is a MEMS-based microphone. The microphone 610 cover an area in the X-Y plane of 4 $mm^2$ or less, preferably 1 $mm^2$ or less, or even 0.5 $mm^2$ or less. The microphone 610 may include a membrane 830, which is excited by the received sound pressure received by the microphone 610. The excitation of the membrane 830 of microphone 610 is converted into an electric signal representing the received sound pressure. This signal is also referred to as a feedback signal e(t), whereas it sampled discrete representation is the signal e(n) in this disclosure (see also the discussion of FIG. 11).

The one or more microphones 610 are mounted to the upper surface 630 of the cover 201. The one or more microphones 610 are mounted on the surface 630 at positions so as to not cover the sound outlet openings 202 of the cover 201 and in close proximity to the sound outlet openings 202. Mounting the one or more microphones 610 near the sound outlet openings 202 of the cover 201 of the MEMS-based sound transducer 200 facilitates substantially reducing the length of the acoustic path 620 of the sound emitted from the MEMS-based sound transducer 200. This allows to substantially reduce the phase difference between actuation signal $\tilde{y}(t)$ (or its discrete representation $\tilde{y}(n)$, see FIG. 11) used to generate the sound emitted from the MEMS-based sound transducer 200 and the feedback signal e(t) (or its discrete representation e(n)) representing the sound received by the one or more microphones 610.

In further embodiments, the microphone 610 is connected to the cover 201 of the MEMS-based sound transducer 200 in an electrically conductive manner to supply a feedback signal e(t) to the control system 1110 via electrically conductive paths. The electrically conductive path may be implemented in the cover 201 during the manufacturing process of the MEMS-based sound transducer 200. The conductive paths may connect to a control system 1110 of micromechanical loudspeaker system 600. For example, intermediate layers, in which the sidewalls 230/530 and actuators 240, and the base 211 of the MEMS-based sound transducer 200 are formed, may include vias and electrically conductive paths to provide for the interconnections between the control system 1110 controlling the MEMS-based sound transducer 200 and the microphone 610. For example, a ball grid array could be used to interconnect the microphone 610 and respective contacts provided at the upper surface 630 of the cover 201.

In some embodiments, the position of the microphone 610 on the cover 210 is selected such that the phase difference between the actuation signal $\tilde{y}(t)$ (or its discrete representation $\tilde{y}(n)$) used to generate the sound emitted from the MEMS-based sound transducer 200 and the feedback signal e(t) (or its discrete representation e(n)) representing the sound received by the microphones 610 is less than or equal to 2°. This allows realizing a cut-off frequency of at least 1 kHz.

In addition or alternatively, the length of the acoustic path 620 between the microphone 610 and its nearest adjacent sound outlet opening 203 is less than or equal to 2 mm and preferably less than or equal to 1 mm. It should be noted that the phase difference and the length of the acoustic path 620 are linked through the speed of sound (which may be assumed to be the speed of sound in air $v_{air}=(331.3+0.606\cdot T)$ m/s, where T is the temperature in ° C.).

In some embodiments, the position of the microphone 610 on the surface 630 of the cover 201 is selected such that the phase difference of the sound signal at the point of sound reception (e.g. centroid or center of area (in X-Y plane) of the microphone 610, respectively, of its membrane 830) and the sound signal emitted at the closest point of sound emission (e.g. the centroid or center of area (in X-Y plane) of the nearest sound outlet opening 202) is less than or equal to 2° to realize a cut-off frequency of at least 1 kHz.

In addition or alternatively, the distance between the centroid or center of area of microphone 610 in the X-Y plane (the plane perpendicular to the movement of the actuators 240) and the centroid (or center of area) in the X-Y plane of the nearest adjacent sound outlet opening 202 is less than or equal to 2 mm and preferably less than or equal to 1 mm. Please note that there may be also two nearest adjacent sound outlet openings 203, 204, the centroids of which have the same distance from the centroid or center of area of the microphone 610 as for example shown in FIG. 7.

If there are multiple microphones 610 provided, the positions of the microphones 610 on the cover 210 are selected such that the phase difference between the actuation signal $\tilde{y}(t)$ (or its discrete representation $\tilde{y}(n)$) and the feedback signal e(t) (or its discrete representation e(n)) of each respective one of the microphones 610 is less than or equal to 2°. In addition or alternatively, the length of the acoustic path 620 between each of the microphones 610 and its respective nearest adjacent sound outlet opening is less than or equal to 2 mm and preferably less than or equal to 1 mm.

Figure 10:
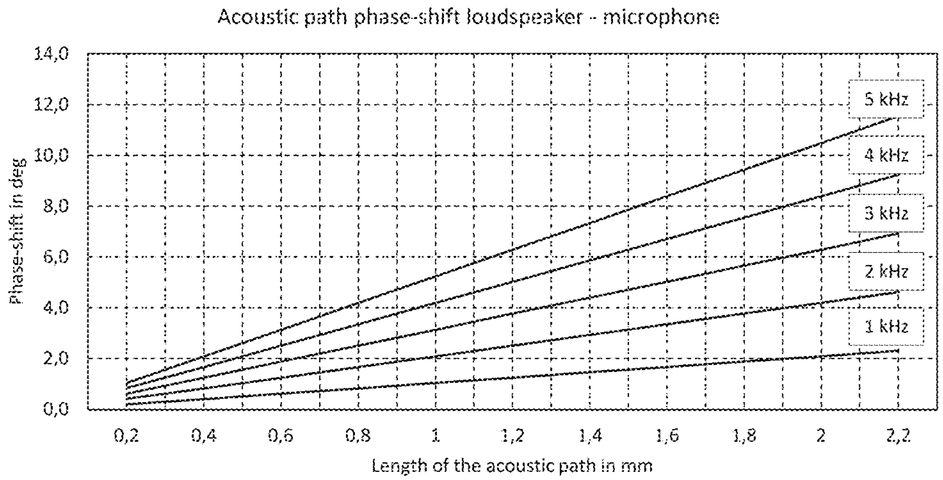
FIG. 10 illustrates the influence of the length of the acoustic path between the loudspeaker and a microphone on the phase-shift.

As noted already above, in some embodiments, the micromechanical loudspeaker system 600 may further implement ANC functionality, as explained for example in connection with FIG. 1 hereinabove or as will be explained in connection with FIG. 11 below. Selecting the position of the one or more microphones 610 in the above-described manner may facilitate improving the stability of the ANC functionality provided by the micromechanical loudspeaker system 600. The upper cut-off frequency for conventional ANC systems may be about 1 kHz. FIG. 10 illustrates the influence of the length of the acoustic path between the loudspeaker and a microphone on the phase-shift. The phase-shift is indicated for different cutoff-frequencies ranging from 1 kHz to 5 kHz and for respective lengths of the acoustic path 620. As shown in FIG. 10, for a cut-off frequency of 1 kHz and a phase shift of 2°, the acoustic path 620 should be 2 mm or less for a discrete set-up. Hence, the distance of the (centroid or center of area of the) microphone 610 from the (centroid or center of area of the) nearest sound outlet opening 202, 203, 204 should thus be 2 mm or less. At an upper ANC cut-off frequency of approx. 1 kHz, the phase shift is 2° for the length of an acoustic path of 2 mm. For the same phase shift of 2° and a cut-off frequency of 2 kHz, the distance of the microphone 610 from the nearest sound outlet opening 202, 203, 204 should thus be 1 mm or less. In general, if the upper cut-off frequency is to be increased or the phase shift is to be reduced, this requires reducing the length of the acoustic path 620 between microphone 610 from the nearest sound outlet opening 202, 203, 204 while maintaining the same sound velocity. FIG. 10 yields that doubling the cut-off frequency requires halving of the acoustic path length 620. In conventional implementations, realization of the acoustic path length 620 below 2 mm with discrete components is commonly problematic.

However, using the loudspeaker system 600 disclosed hereinabove facilitates overcoming this shortcoming in prior art systems, as the microphone 610 can be positioned in the immediate vicinity of the sound outlet openings 202 in the cover 201, so that the length of the acoustic path 620 can be reduced even significantly below 2 mm and even below 1 mm. In particular, the acoustic path length between the centroid of area of the sound outlet opening 202 and the centroid of area of the membrane 830 of the microphone 610 (in the XY plane) can be reduced to a suitable length allowing for higher cut-off frequencies of the ANC algorithm thereby contributing to the increased stability of the ANC algorithm that improves the sound quality.

Figure 8:
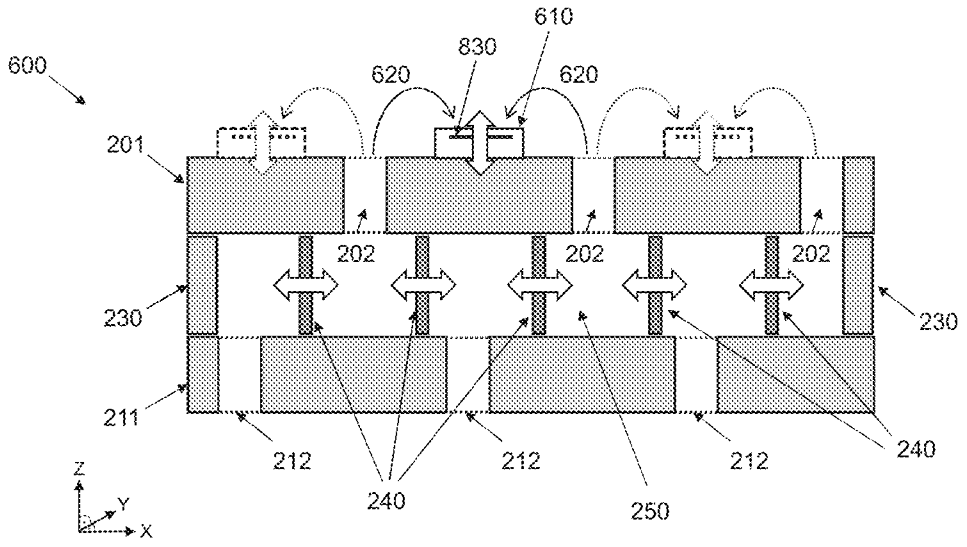
FIG. 8 shows another view of the micro mechanical loudspeaker system 600 in FIGS. 6 and 7.

An alternative or additional feature of the embodiments described herein (which does not require the implementation of ANC) is the reduction of the structure-born sound coupling between the MEMS-based sound transducer 200 and the (one or more) microphone(s) 610. This will be explained in connection with FIG. 8 in more detail. FIG. 8 is another view of the micro mechanical loudspeaker system 600 in FIGS. 6 and 7. In this embodiment, it is assumed that the microphone has membrane 830 which is to be excited in the thickness direction (Z direction) as illustrated by the white arrow, i.e. in a direction that is perpendicular to the plane in which the actuators 240 are excited. Accordingly, the direction of excitation of the membrane 830 is perpendicular to the excitation/movement of the actuators 240 of the MEMS-based sound transducer 200. Hence, in the example shown in FIG. 8, the excitation of the actuators 240 in the X-Y plane by a control system 1110 does not cause additional vibrations of the cover 201 in the Z direction. This can help reducing the structure-borne coupling between the MEMS-based sound transducer 200 and the microphone 610.

Another factor that influences the structure-born coupling between the MEMS-based sound transducer 200 in the microphone 610 are the vibrations of the cover 201 that may be caused by the sound pressure being admitted through the sound outlet openings 202 of the cover 201 of the MEMS-based sound transducer 200. Accordingly, in some embodiments, the cover 201 (and optionally further the base 211) have sufficient stiffness (for example in terms of their bending stiffness K) to suppress those vibrations. Notably, this improvement does not necessarily require that the movement of the actuators 240 in a direction perpendicular to the direction of sound emission.

According to one example embodiment, the cover 201 (and base 211) is (are) designed in such a way that its vibration amplitude and vibration area result in a sound pressure contribution that is at least 40 dB (preferably at least 50 dB and more preferably at least 60 dB) lower than the (intended) sound pressure component caused by a sound pressure provided from the inside of the MEMS-based sound transducer 200 (i.e. by the movement of the actuators 240 in the cavity 250) through the openings or through holes 202 of the cover 201 (or base 211). The vibration amplitude of the surface 630 of the cover 201 yielding its sound pressure contribution can be measured, for example, using vibrometry (e.g. by means of laser Doppler vibrometer), which is an non-contact vibration measurement of the surface of the cover 201 well known in the art.

Alternatively or additionally, and according to further example embodiments, the cover 201 (and base 211) of the sound transducer 200 may be for example made of semiconductor materials. Suitable semiconductor materials for the cover 201 (and the base 211) of the sound generating device may be materials that have a Young's modulus E equal to or higher than 100 GPa (E≥100 GPa). Preferably, the Young's modulus E is in the range 120 GPa to 190 GPa, noting that the Young's modulus is commonly dependent on the crystal orientation. For example, the cover 201 (and the base 211) could be made of silicon (Si). Silicon is known to have a Young's modulus in the range of 130 GPa to 189 GPa (E ∈ [130 GPa, 189 GPa]), depending on the crystal orientation. The most relevant crystal orientations of silicon are (100), (110) and (111), where the Young's moduli are $E_{100}$≈130 GPa, $E_{110}$≈169 GPa and $E_{111}$≈188 GPa.

In an alternative, the cover 201 (and the base 211) could be also made of germanium (Ge), which may have a Young's modulus in the range of 103 GPa to 140 GPa. Another alternative material for the cover 201 (and the base 211) is silicon germanium ($Si_{1-x}$,$Ge_x$).

The cover 201 (and base 211) may have a thickness in the range of 1000 μm to 100 μm, preferably in the range of 725 μm to 100 μm, more preferably in the range of 400 μm to 250 μm and even more preferably in the range of 300 μm to 200 μm.

Figure 9:
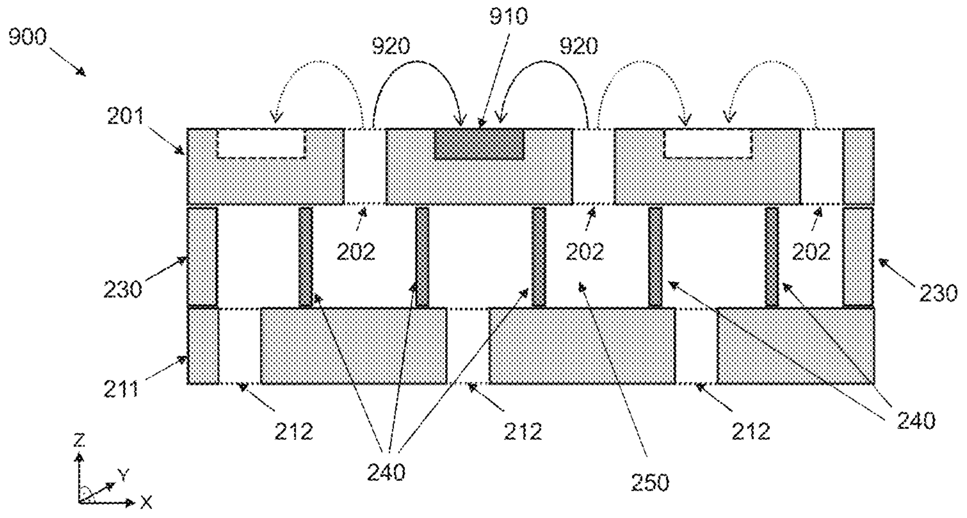
FIG. 9 shows an alternative micromechanical loudspeaker system 900 according to another example embodiment.

In the example embodiment of the micromechanical loudspeaker is system 600 discussed in connection with FIGS. 6-8 hereinabove, the one or more microphones is 610 have been mounted on a surface 630 of the cover 201 of the MEMS-based sound transducer 200. According to alternative embodiments, the microphone may be integrated within the cover 201. For example, the microphone may be formed in one or more layers of the cover 201 in semiconductor manufacturing process. An example embodiment where a microphone 910 is integrated in the cover 201 of the MEMS-based sound transducer 200 is shown in FIG. 9. FIG. 9 shows an alternative micromechanical loudspeaker system 900 which is similar to the micromechanical loudspeaker system 600, except for one or more microphones 910 being integrated into the cover 201. When implementing the microphone in a semiconductor manufacturing process within the cover 201, electrically conductive paths to connect the microphone 910 to the control system 1110 through the intermediate layers of the multilayer device forming the MEMS-based sound transducer 200 can be provided as part of the manufacturing process.

FIG. 11 shows an example embodiment of using a micromechanical loudspeaker system 600 or micromechanical loudspeaker system 900 in combination with a control system 1110 to implement ANC. The control system 1110 may be for example implemented using a digital signal processor (DSP), or using another programmable of non-programmable circuit. In this example embodiment, it is assumed that the micromechanical loudspeaker system 600, 900 and the control system 1110 are used within in-ear headphone. This is however not to be considered limiting. The ANC functionality implemented in control system 1110 is substantially based on the ANC functionality described hereinabove in connection with FIG. 1. FIG. 11 shows a simplified signal flow of an exemplary ANC system implemented in the control system 1110. In contrast to the ANC system of FIG. 1, the ANC system implemented by the control system 1110 includes a feedback loop only using the microphone 610, 910 mounted on or integrated into the MEMS-based sound transducer 200 of the micromechanical loudspeaker system 600, 900 as an internal microphone. The microphone 610, 910, picks up the error signal e(t), which is also referred to as a feedback signal hereinabove. An ADC (analog-to-digital conversion) block 1111 of the control system 1110 performs an analog-to-digital conversion by sampling the error signal e(t). The discrete error signal e(n) is output from the ADC block 1111. The discrete error signal e(n) is provided to an adder, which subtracts the desired audio signal or so-called "useful signal" a(n) from the discrete error signal e(n), thereby producing the error signal $\tilde{e}(n)$, which is passed through a filter K(z) to generate a cancellation signal u(n). A further adder subtracts the cancellation signal u(n) from the desired audio signal a(n). The resultant signal is the discrete audio signal $\tilde{y}(n)$. The discrete audio signal $\tilde{y}(n)$ may be further provided to a driver circuit 1112 which generates actuation signal $\tilde{y}(t)$ from the audio signal $\tilde{y}(n)$. The actuation signal $\tilde{y}(t)$ is used to drive the actuators 240 of the MEMS-based sound transducer 200 to cause the MEMS-based sound transducer 200 to emit sound towards the ear/eardrum of the user. The actuation signal $\tilde{y}(t)$ may be used to drive of all the actuators 240 together. Alternatively, the actuation signal $\tilde{y}(t)$ may be multiple individual actuation signals $\widetilde{y_1}(t)$, $\widetilde{y_2}(t)$, . . . , $\widetilde{y_n}(t)$ that drive respective individual actuators 240 (e.g. n actuators) or respective groups of actuators 240 (e.g. n groups) of the MEMS-based sound transducer 200. This latter alternative may be for example useful to drive the one or more actuators 240 within individual sub-cavities 551, 552, 553 of the MEMS-based sound transducer 200.

The signal path from the MEMS-based sound transducer 200 to the microphone 610, 910 is denoted the secondary path or feedback path. The feedback path includes all steps from the digital output $\tilde{y}(n)$ of the combined cancellation signal to the input of the digital error signal e(n), i.e. the signal conversion by the driver circuit 1112 (which may include digital-to-analog conversion and amplification), the loudspeaker characteristics of the MEMS-based sound transducer 200, the acoustic path 620, the microphone characteristics of the microphone 610, 910 and analog-to-digital conversion by the ADC block 1110. To optimize the performance of an ANC system, the acoustic path 620 between the microphone 610, 910 and the MEMS-based sound transducer 200 is decreased as explained hereinabove to thereby improve the stability of the ANC functionality.

Although FIG. 11 illustrates a feedback-based ANC scheme, the embodiments of the invention are not limited in this respect. The control system 1110 may also implement a hybrid ANC function by extending the feedback-based ANC scheme explained in connection with FIG. 11 by a feedforward loop as described in connection with FIG. 1. For this, another microphone may be added to the micromechanical loudspeaker system 600, 900. For example, the MEMS-based sound transducer 200 may include the additional microphone on a surface of the base 211. The additional microphone picks up the ambient noise x(t). The control system 1110 may perform ADC conversion of the ambient noise x(t) (e.g. using ADC block 1111 or another ADC block) to output the discrete ambient noise signal x(n). The discrete ambient noise signal x(n) is further subjected to a filter W(z) to the generates the cancellation signal y(n). The audio signal audio signal $\tilde{y}(n)$ is obtained by subtracting the cancellation signal u(n) and the cancellation signal y(n) from the desired signal a(n), as shown in FIG. 1.

According to embodiments, the processing of signals for implementing a feedback-based ANC function discussed in connection with FIG. 11 of a hybrid ANC function may be implemented in hardware, such as programmable circuitry (e.g. field programmable gate array (FPGA), programmable logic device (PLD), etc.), in a hardened (i.e. non-programmable) circuitry (e.g. application-specific integrated circuit (ASIC), one or more digital signal processor (DSP) cores, etc.) or a hybrid combination thereof. The micromechanical loudspeaker system 600, 900 may be integrated in hardened circuitry. Furthermore, at least a part of the processing of the ANC algorithm may be implemented in software that is executed by the hardware (using some processing unit).

Figure 12:
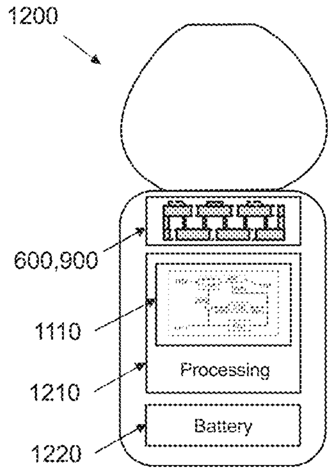
FIG. 12 illustrates an example embodiment of an in-ear headphone 1200 using a micromechanical loudspeaker system 600, 900 described herein.

FIG. 12 illustrates an example embodiment of an in-ear headphone 1200 using a micromechanical loudspeaker system 600, 900 described herein. The headphone 1200 includes a micromechanical loudspeaker system 600, 900 according to one of the various embodiments described herein. Furthermore, the headphone 1200 includes a processing unit 1210. In the example illustrated in FIG. 12, the processing unit 1210 may implement the control system 1110 described in connection with FIG. 11 to implement ANC in the headphone 1200. Alternatively, some of functionality of control system 1110 (e.g. the functionality of the adders and filters) could also be implemented in hardware circuitry or in the digital domain in form using software or a hybrid of those solutions. Furthermore, the headphone 1200 may include a battery 1222 power the processing unit 1210 and any other components requiring power within the headphone 1200. Although not shown in FIG. 12, the headphone 1200 may further include components that facilitate Bluetooth connectivity to external devices (for example a mobile phone, laptop, tablet computer, etc.) to provide an audio source to be output by the headphone 1200. In addition or alternatively, components of the headphone 1200 may provide Wi-Fi connectivity or cellular connectivity (e.g. according to 3GPP standards) for this purpose. Further in addition alternatively, the headphone 1200 can include components facilitating wired or wireless charging of the battery. For instance, the headphone 1200 could a USB connector for charging and/or communication of data with an external device.

What is claimed is:

1. A microelectromechanical loudspeaker system implemented as a system-on-chip or system-in-package, comprising:
   - a microelectromechanical sound-generating device implemented in a microelectromechanical system (MEMS), wherein the MEMS comprises a cavity formed between a planar cover, a planar base and circumferential sidewalls provided between the cover and the base,
   - wherein the MEMS further comprises a plurality of movable actuators for generating sound, wherein the actuators are provided in the cavity between the cover and the base, and wherein the cover comprises a plurality of sound outlet openings to emit sound in a direction transverse to the cover;
   - a microphone mounted on the cover or integrated in the cover, wherein the microphone is positioned adjacent to at least one sound outlet opening of the cover.

2. The microelectromechanical loudspeaker system according to claim 1, wherein the acoustic path between the microphone and the at least one adjacent sound outlet opening is less than or equal to 2 mm.

3. The microelectromechanical loudspeaker system according to claim 1, wherein the microelectromechanical loudspeaker system implements an active noise cancelling (ANC) function, wherein the microphone is configured to detect the sound emitted through the sound outlet openings of the cover and interference noise; and the microelectromechanical loudspeaker system further comprises a control system configured to control the sound generation of the microelectromechanical sound-generating device based on the sound detected by the microphone and interference noise such that the detected interference noise is suppressed;

wherein the control system is configured to control sound generation of the microelectromechanical sound-generating device using an actuation signal that drives the actuators, and to receive a feedback signal from the microphone, wherein the feedback signal represents the sound emitted through the sound outlet openings of the cover and the interference noise.

4. The microelectromechanical loudspeaker system according to claim 1, wherein the position of the microphone on the cover is selected such that the phase difference between the actuation signal and the feedback signal is less than or equal to 2° to realize a cut-off frequency of at least 1 kHz.

5. The microelectromechanical loudspeaker system according to claim 1, wherein the microelectromechanical sound-generating device is a multilayer silicon device;

wherein the cover, the base, and the actuators are formed in different layers of the multilayer silicon device.

6. The microelectromechanical loudspeaker system according to claim 1, wherein the microphone is a discrete MEMS-based component mounted on the cover of the microelectromechanical sound-generating device.

7. The microelectromechanical loudspeaker system according to claim 6, wherein the microphone is connected to the cover of the microelectromechanical sound-generating device in an electrically conductive manner to supply a feedback signal to the control system via electrically conductive paths of the microelectromechanical sound-generating device, wherein the feedback signal represents the sound emitted through the sound outlet openings of the cover and the interference noise.

8. The microelectromechanical loudspeaker system according to claim 5, wherein the microphone is formed in one or more semiconductor layers of the semiconductor device on a side of the cover facing away from the actuators.

9. The microelectromechanical loudspeaker system according to claim 1, wherein the control system is arranged on the base and/or the cover of the microelectromechanical sound-generating device and is connected to the microelectromechanical sound-generating device in an electrically conductive manner.

10. The microelectromechanical loudspeaker system according to claim 1, wherein the microelectromechanical loudspeaker system comprises a plurality of microphones positioned in the planar footprint of the microelectromechanical sound-generating device between respective adjacent sound outlet openings of the cover, wherein the microphones are configured to detect the sound emitted through the respective sound outlet openings of the cover and any interference noise;

wherein the acoustic path between each of the microphones and one of its adjacent sound outlet openings is less than or equal to 2 mm.

11. The microelectromechanical loudspeaker system according to claim 1, wherein the cavity of the microelectromechanical sound-generating device consists of multiple independent sub-cavities, wherein each of the independent sub-cavities comprises one or more of the actuators for generating sound in an associated frequency band of the audible frequency spectrum which is emitted through sound outlet openings of the cover and the base provided in the planar footprint of each of the sub-cavities;

wherein the microelectromechanical loudspeaker system comprises multiple microphones provided on the cover or integrated in the cover of the microelectromechanical sound-generating device to detect the sound generated and emitted from each of the independent sub-cavities and interference noise.

12. The microelectromechanical loudspeaker system according to claim 1, wherein the actuators are movable in a plane that is parallel to the cover and/or transverse to the direction of the sound emitted from the cover.

13. The microelectromechanical loudspeaker system according to claim 1, wherein the cover has a stiffness selected to avoid structure-borne sound coupling between the cover and the microphone mounted on the cover or integrated in the cover.

14. The microelectromechanical loudspeaker system according to claim 1, wherein the cover has a stiffness configured so that a sound pressure component caused by a vibration of the cover is at least 60 dB lower than the sound pressure component caused by the sound emitted through the sound outlet openings of the cover.

15. The microelectromechanical loudspeaker system according to claim 1, wherein the microphone comprises a membrane to receive sound emitted through the sound outlet openings of the cover and interference noise, wherein the membrane is excited in a direction substantially perpendicular to a plane defined by the planar surface of the planar cover.

16. The microelectromechanical loudspeaker system according to claim 1, wherein the actuators are movable in a plane that is transverse to the direction of sound transmission of the microelectromechanical sound-generating device;

wherein the plurality of sound outlet openings to emit sound in the direction of sound transmission which is transverse to the cover (201).

17. The microelectromechanical loudspeaker system according to claim 1, wherein the actuators are driven electrostatically.

18. The microelectromechanical loudspeaker system according to claim 1, wherein the cover has a stiffness selected to avoid structure-borne sound coupling between the cover and the microphone mounted on the cover or integrated in the cover.

19. The microelectromechanical loudspeaker system according to claim 1, wherein the cover has a stiffness configured so that a sound pressure component caused by a vibration of the cover is at least 60 dB lower than the sound pressure component caused by the sound emitted through the sound outlet openings of the cover.

20. A device with a microelectromechanical loudspeaker system according to claim 1, wherein the device is designed as a near-field speaker, a headphone, or as a hearing aid.

* * * * *